United States Patent Office 3,383,437
Patented May 14, 1968

3,383,437
TETRACYCLO TRIDECA PHOSPHORUS ESTERS
Hans F. W. Röchling, Hangelar, Germany, and Johannes Th. Hackmann, Herne Bay, England, assignors to Shell Oil Company, New York, N.Y., a corporation of Delaware
No Drawing. Filed Mar. 29, 1965, Ser. No. 443,691
Claims priority, application Great Britain, Apr. 3, 1964, 13,850/64
4 Claims. (Cl. 260—957)

This invention relates to novel organophosphorus compounds, to insecticidal compositions containing them, and to the use of said compounds and compositions in combatting insect pests, and in protecting ornamental and crop plants from attack by insects.

The novel compounds of the invention can be represented by the general formula:

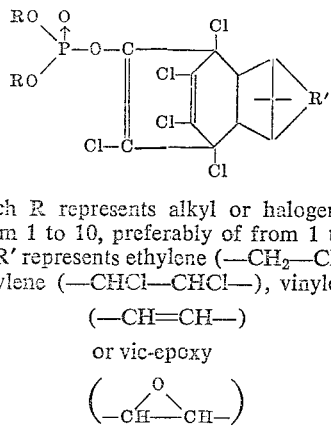

wherein each R represents alkyl or halogen-substituted alkyl of from 1 to 10, preferably of from 1 to 4, carbon atoms, and R' represents ethylene (—$CH_2$—$CH_2$—), sym-dichloroethylene (—CHCl—CHCl—), vinylene (—CH=CH—)

or vic-epoxy

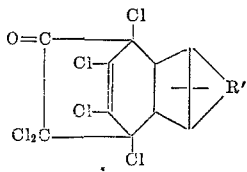

In these compounds, the halogen of the halogen-substituted alkyl preferably is middle halogen—that is, bromine or chlorine—with suitable halogen-substituted alkyl groups including mono-, di- and tri- chloro- and bromo-methyl, 2-chloroethyl, 2-bromoethyl, 1-chloropropyl, 1,2-dichloroethyl, 3-chloropropyl, 2-bromopropyl, 2,3-dichloropropyl, 2,3,3-trichloropropyl, and the like.

These novel compounds can be prepared by reacting the appropriate trialkyl phosphite with 1,8,9,10,11,11-hexachloro - 12 - oxotetracyclo[6,2,1,1$^{3,6}$,0$^{2,7}$]trideca - 4,9-diene, the corresponding 9-ene, the corresponding 1,4,5,8, 9,10,11,11-octachloro-9-ene or the corresponding 4,5-epoxy-9-ene. These compounds are themselves novel and may be represented by the following general structural formula:

wherein R' has the meaning already given.

Although the reaction may be carried out at the ambient temperature, the reaction is better effected at a temperature in the range 30° to 200° C., preferably in the range 50° to 150° C. The trialkyl phosphite starting material, being a liquid under normal conditions, provides a suitable reaction medium; however it may be necessary or desirable to employ in addition an inert solvent or solvents. Examples of suitable solvents are acetone, benzene, dioxane, hexane, tetrahydrofuran and light petroleum cuts.

The novel starting materials, described above, may be prepared by reacting bicyclo[2,2,1]hepta-2,5-diene with hexachlorocyclohexa-2,4-dieneone and where appropriate reacting the product therefrom with an epoxidising agent. Either or both these reactions are preferably carried out in the presence of an inert solvent or solvents for example, light petroleum, chloroform and cyclohexane. The epoxidation reaction may be effected by means of any known epoxidising agent is often prepared or available in the form of a solution in an inert solvent and it is in this form that it is particularly suitable for the epoxidation reaction.

The preparation of the precursors is illustrated by the following reaction scheme:

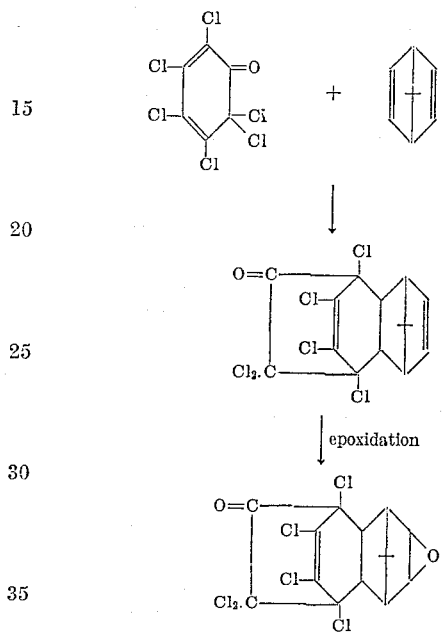

The diene can be hydrogenated to the coresponding -9-ene, or it can be chlorinated to the corresponding 1,4,5, 8,9,10,11-octochloro-9-ene.

A particular example of the compounds of the invention is 1,8,9,10,11-pentachloro-12-dimethoxyphosphinyloxytetracyclo[6,2,2,1$^{3,6}$,0$^{2,7}$]trideca - 4,9,11 - triene. This compound is a particular interest in that it combines a high level of insecticidal activity with a remarkably low mammalian toxicity. It is of particular use in combatting caterpillars of the species *Plutella maculipennis* (diamond-back moth) and *Pieris brassicae* (large white butterfly). It also shows considerable activity against *Heliothis zea* (corn earworm). The compound has in tests with rats, been shown to possess a mammalian toxicity ($LD_{50}$) of 400 to 800 mg./kg. body weight, a value which is surprisingly low for an organo-phosphorus compound. The insecticidal effect of this compound and other compounds of the invention is shown in the examples.

According to another feature of the invention, the novel compounds of this invention may be formulated as insecticidal compositions comprising one or more of said compounds and a carrier, a surface active agent, or both a carrier and a surface active agent. The carrier may be a solid or liquid and may be of natural or synthetic origin. The carrier may be a fertiliser. The surface active agent may be a wetting, emulsifying or dispersing agent.

The term "carrier" as used herein means a material, which may be inorganic or organic and synthetic or of natural origin, with which the active substance is mixed or formulated to facilitate its storage, transport and handling, or its application to the plant, seed, soil or other object to be treated. The carrier may be a solid, a liquid or a compressed gas.

The carrier material may be any of the carrier materials usually applied in formulating pesticides. Examples of suitable solid carrier materials are talc, gypsum, diatomite, silicates, pyrophylite, clays of the montmorillonite and kaolinite groups, lime, wood flour, sulfur, carbon, resins such as, for example, polyvinyl chloride and polymers and copolymers of styrene, waxes, and solid fertilizers. Examples of suitable liquid carrier materials are water, the conventional horticultural petroleum spray oils, aromatic hydrocarbons such as, for example, benzene, toluene, xylene, ethylbenzene, cumene, and isodurene, coal tar fractions, straight-run petroleum distillates, thermally or catalytically cracked hydrocarbon oils, platformates, refined gas oil, light lubricating oil fractions, refined kerosene, animal and vegetable oils, and organic solvents such as, for example, methanol, ethanol, isopropanol, n-butanol, amyl alcohol, acetone, methyl ethyl ketone, methyl isobutyl ketone, glycols, glycol ethers, polyalkylene glycol ethers and esters, and chlorinated hydrocarbons.

The surface active agent may be any of the surface active agents usually applied in formulating pesticides. Examples of suitable surface active agents are alkylaryl sulfonates, alkyl sulfates containing at least 10 carbon atoms in the molecule, alkylaryl polyoxyethylene glycol ethers, sorbitan esters of fatty acids containing at least 10 carbon atoms in the molecule, alkylamide sulfonates, and condensation products of ethylene oxide with fatty acid esters, for example the oleic acid ester of anhydrosorbitol. Although both anion- and cation-active surface active agents may be used, the non-ionic surface active agents are preferred.

The compositions of the invention may be concentrates, suitable for storage or transport and containing, for example, from 10 to 95% by weight of a compound of the invention or may be dilute compositions containing, for instance, 0.00001 to 2% or even up to 10% by weight of active compound based on the total weight of the composition.

The compositions of the invention may be formulated as dusts comprising an intimate mixture of a compound of the invention and a finely powdered solid carrier, as wettable powders comprising a compound of the invention mixed with a dispersing agent and, if desired, a finely divided solid carrier, or as emulsifiable concentrates which are concentrated solutions or dispersions of a compound of the invention in an organic liquid, preferably a water-insoluble organic liquid, for example a petroleum hydrocarbon fraction, preferably containing an added emulsifying agent. Aqueous emulsions or dispersions containing an organophosphorus compound as specified above are also within the scope of the invention.

The compositions of the invention may contain in addition to the pesticidal organophosphorus compounds specified above other ingredients, for example, stickers, wetting agents, synergists, stabilizers, or biologically active substances such as other insecticides, fungicides or herbicides. Thus, insecticides such as, for example, 1,1,1-trichloro-2,2-bis(p-chlorophenyl)ethane; endrin; dieldrin; aldrin; O,O - dimethyl-O-(2,2-dichlorovinyl)phosphate; O,O-dimethyl-O-(1,2-dibromo - 2,2 - dichloroethyl)phosphate; O,O - dimethyl-O-[1-methyl-2(1-phenylcarbethoxy)vinyl] phosphate; O,O-dimethyl-O-[2-N,N-dimethylcarbamoyl-1-methylvinyl]phosphate; rotenone and pyrethrum may be incorporated in the compositions of the invention.

The present invention also relates to a method of combating insects which comprises bringing the insects into contact with one or more of the compounds or compositions specified above. Furthermore, the invention relates to a process for improving crop yields which comprises applying one or more of the compounds or compositions specified above to a crop area before or after crop planting, or before or after crop emergence.

The following examples further illustrate the invention. In these examples, "parts" means parts by weight unless otherwise indicated, with parts by weight bearing the same relationship to parts by volume as does the kilogram to the liter.

Example I—Preparation of 1,8,9,10,11-pentachloro-12-dimethoxyphosphinyloxytetracyclo[6,2,2,1$^{3,6}$,0$^{2,7}$]trideca-4,9,11-triene

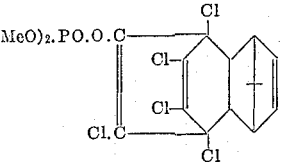

3.9 parts of 1,8,9,10,11,11-hexachloro-12-oxotetracyclo-[6,2,2,1$^{3,6}$,0$^{2,7}$]trideca-4,9-diene were added slowly to 3.7 parts of trimethyl phosphite at a temperature of 80° to 85° C. The resulting mixture was then stirred for two hours at a temperature of 110° C. The methyl chloride produced during the reaction was allowed to escape. The excess trimethyl phosphite was then distilled from the reaction mixture at a temperature of 90° C. under a pressure of 5 torr. The remaining residue solidified in cooling which, after crystallisation from light petroleum, gave the desired product, melting at 84° to 85° C. Yield 95%.

Analysis (*percent by weight*).—Found: C, 38.6; H, 3.0; Cl, 37.8; P, 6.9. $C_{15}H_{14}Cl_5PO_4$ requires: C, 38.6; H, 3.0; Cl, 38.1; P, 6.7.

The 12-diethoxyphosphinyloxy analogue was prepared and isolated in a manner similar to that described above but using triethyl phosphite instead of trimethyl phosphite. 1,8,9,10,11-pentachloro - 12 - diethoxyphosphinyloxytetracyclo [6,2,2,1$^{3,6}$,0$^{2,7}$]trideca-4,9,11-triene was prepared in the form of an oil, boiling at 168° to 179° C. at 0.2 torr. Yield 86%.

Analysis (*percent by weight*).—Found: C, 41.2; H, 3.6; Cl, 35.9; P, 6.3. $C_{17}H_{18}Cl_5PO_4$ requires: C, 39.6; H, 3.7; Cl, 35.9; P, 6.4.

Example II. — Preparation of 1,8,9,10,11-pentachloro-12 - dimethoxyphosphinyloxytetracyclo[6,2,2,1$^{3,6}$,0$^{2,7}$] trideca-4,5-epoxy-9,11-diene

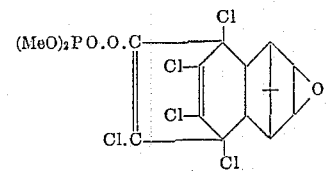

2.8 parts of 1,8,9,10,11,11-hexachloro-12-oxotetracyclo [6,2,2,1$^{3,6}$,0$^{2,7}$]trideca - 4,5-epoxy-9-ene were dissolved in 10 parts by volume of trimethyl phosphite and heated for 90 minutes at a temperature of 50° C. The reaction was carried out in an open flask and stirred continuously. The desired product was isolated from the reaction mixture by chromatographic means. The mixture was dissolved in 10 parts by volume of benzene containing 5 parts of silica gel and the resulting mixture placed on a column of the same silica gel. The unchanged starting materials were eluted with benzene, and the desired product came off the column by eluting with benzene containing 10% by volume of acetone. The desired product was further purified by repeating the chromatographic sequence; yellow oil resulted. Yield 87%.

Analysis (*percent by weight*). — Found: C, 38.8; H, 3.4; Cl, 35.6; P, 6.0. $C_{15}H_{14}Cl_5PO_5$ requires: C, 37.3; H, 2.9; Cl, 36.8; P, 6.4.

The 12-diethoxyphosphinyloxy analogue was prepared and isolated by a method similar to that described above but using triethyl phosphite instead of trimethyl phosphite. 1,8,9,10,11 - pentachloro-12-diethoxyphosphinyloxytetracyclo[6,2,2,1$^{3,6}$,0$^{2,7}$]trideca-4,5-epoxy-9,11-diene was prepared in the form of a yellow oil. Yield 85%.

Analysis (*percent by weight*). — Found: C, 41.9; H, 3.7; Cl, 34.5; P, 6.4. $C_{17}H_{18}Cl_5PO_5$ requires: C, 40.0; H, 3.5; Cl, 34.5; P, 6.4.

Example III.—Preparation of 1,8,9,10,11,11-hexachloro-12-oxotetracyclo[6,2,2,1³,⁶,0²,⁷]trideca-4,9-diene

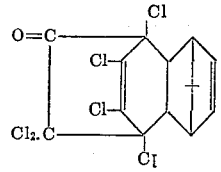

45 parts of hexachlorocyclohexa-2,4-dieneone was dissolved in 100 parts by volume of a light petroleum cut (boiling point 40° to 60° C.) and added dropwise to a stirred solution of 26.6 parts of bicyclo[2,2,1]hepta-2,5-diene in 100 parts by volume of the light petroleum cut. The resulting mixture was refluxed for two hours, after which the mixture was cooled to 0° C. and the solid material filtered off. After crystallisation from an acetone/water mixture the desired product was obtained, melting point 160°–161° C. Yield 55%.

*Analysis (percent by weight).* — Found: C, 39.4; H, 2.2; Cl, 54.8. $C_{13}H_8Cl_6O$ requires: C, 39.7; H, 2.0; Cl, 54.2.

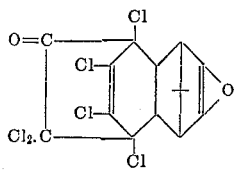

Example IV.—Preparation of 1,8,9,10,11,11-hexachloro-12-oxotetracyclo[6,2,2,1³,⁶,0²,⁷]trideca-4,5-epoxy-9-ene- 7.8 parts of the compound prepared in Example III was dissolved in 10 parts by volume of chloroform and added to a freshly prepared 0.02 molar solution of 4.6 parts of perbenzoic acid in chloroform. The solution was kept at 0° C. for two hours, left overnight at room temperature, and washed twice with 10 parts by volume portions of concentrated sodium bicarbonate solution and one with water. The mixture was dried over magnesium sulphate and the solvent evaporated off, leaving the crude product. The pure material, melting point 188°–189° C., was obtained by crystallisation from a water/acetone mixture. Yield 92%.

*Analysis (percent by weight).* — Found: C, 38.3; H, 2.0; Cl, 52.5. $C_{13}H_8Cl_6O_2$ requires: C, 38.2; H, 2.0; Cl, 52.8.

Example V.—Insecticidal tests

Certain compounds of the invention specified below were tested for activity against a representative range of insects: *Musca domestica* (housefly), *Aedes aegypti* larvae (yellow fever mosquito), *Phaedon cochliariae* (mustard beetle), *Plutella maculipennis* larvae (diamond-back moth), and *Pierio brassicae* larvae (large white butterfly), abbreviated to *M.d.*, *A.a.*, *P.c.*, *P.m.*, and *P.b.*, respectively. A composition containing 0.1% by weight of the compound under test in acetone was used against *M.d.* and *A.a.* A composition containing 0.2% by weight of the compound under test in an acetone/water/surface active agent solution was used against the remaining insect species. The surface active agent used was an alkylphenol/ethylene oxide condensate available commercially as Triton X-100, the word "Triton" being a registered trademark. A summary of the tests carried out is given in the following table, "A" denoting total kill.

| Compound | M.d. | A.a. | P.c. | P.m. | P.b. |
|---|---|---|---|---|---|
| 1,8,9,10,11-Pentachloro-12-dimethoxyphosphinyloxytetra-cyclo[6,2,2,-1³,⁶,0²,⁷]trideca-4,9,11-triene | A | A | A | A | A |
| 1,8,9,10,11-Pentachloro-12-dimethoxyphosphinyloxytetra-cyclo[6,2,2,-1³,⁶,0²,⁷]trideca-4,5-epoxy-9,11-diene | A | A | A | A | |

Example VI

The activity of 1,8,9,10,11-pentachloro-12-dimethoxyphosphinyloxytetracyclo[6,2,2,1³,⁶,0²,⁷]trideca-4,9,11-triene with respect to the corn earworm, *Heliothis zea*, was determined by caging corn earworm larvae on cut broad bean plants inserted in water after formulations of the test compound in water, had been sprayed thereon. Two replicates were used with each test, various tests being directed to different concentrations of the test compound in the liquid formulations. The $LC_{50}$ concentration—the concentration of the active material in the sprayed formulation required to cause 50 percent mortality of the test insect—was found to be 0.019 gram per 100 milliliters of solvent.

We claim as our invention:
1. A phosphorus ester of the formula:

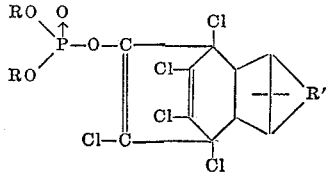

wherein each R independently contains up to 10 carbon atoms and is a member of the group consisting of alkyl and middle halogen-substituted alkyl, and R' represents a member of the group consisting of ethylene, sym-dichloroethylene, vinylene and vic-epoxy.

2. An ester according to claim 1 wherein each of R contains from 1 to 4 carbon atoms.

3. An ester according to claim 1 wherein each of R is methyl.

4. 1,8,9,10,11 - pentachloro-12-dimethoxyphosphinyloxytetracyclo[6,2,2,1³,⁶,0²,⁷]trideca-4,9,11-triene.

References Cited

UNITED STATES PATENTS 3,142,695   7/1964   Rolih et al. _____ 260—956

CHARLES B. PARKER, *Primary Examiner.*

R. L. RAYMOND, *Assistant Examiner.*